(12) United States Patent
Chereau et al.

(10) Patent No.: US 8,173,209 B2
(45) Date of Patent: *May 8, 2012

(54) POLYOLEFIN DISPERSION TECHNOLOGY USED FOR RESIN COATED SAND

(75) Inventors: Loic F. Chereau, Langnau Am Albis (CH); Julien H. J. M. Damen, Mettmenstetten (CH); Thomas Allgeuer, Wollerau (CH)

(73) Assignee: Dow Global Technologies LLC, Midland, MI (US)

( * ) Notice: Subject to any disclaimer, the term of this patent is extended or adjusted under 35 U.S.C. 154(b) by 1042 days.

This patent is subject to a terminal disclaimer.

(21) Appl. No.: 11/900,401

(22) Filed: Sep. 11, 2007

(65) Prior Publication Data

US 2008/0182040 A1    Jul. 31, 2008

Related U.S. Application Data

(60) Provisional application No. 60/843,682, filed on Sep. 11, 2006.

(51) Int. Cl.
  B32B 5/66    (2006.01)
(52) U.S. Cl. .............. 427/212; 427/213.3; 427/213.31
(58) Field of Classification Search .................. 427/212, 427/213.3, 213.31
  See application file for complete search history.

(56) References Cited

U.S. PATENT DOCUMENTS

| | | |
|---|---|---|
| 3,645,992 A | 2/1972 | Elston |
| 3,758,643 A | 9/1973 | Fischer |
| 3,806,558 A | 4/1974 | Fischer |
| 4,076,698 A | 2/1978 | Anderson et al. |
| 4,104,210 A | 8/1978 | Coran et al. |
| 4,130,535 A | 12/1978 | Coran et al. |
| 4,202,801 A | 5/1980 | Petersen |
| 4,250,273 A | 2/1981 | Bohm et al. |
| 4,271,049 A | 6/1981 | Coran et al. |
| 4,311,628 A | 1/1982 | Abdou-Sabet et al. |
| 4,340,684 A | 7/1982 | Bohm et al. |
| 4,599,392 A | 7/1986 | McKinney et al. |
| 4,762,890 A | 8/1988 | Strait et al. |
| 4,927,882 A | 5/1990 | Bayan |
| 4,927,888 A | 5/1990 | Strait et al. |
| 4,950,541 A | 8/1990 | Tabor et al. |
| 4,988,781 A | 1/1991 | McKinney et al. |
| 5,051,478 A | 9/1991 | Puydak et al. |
| 5,248,729 A | 9/1993 | Inoue et al. |
| 5,272,236 A | 12/1993 | Lai et al. |
| 5,278,272 A | 1/1994 | Lai et al. |
| 5,384,373 A | 1/1995 | McKinney et al. |
| 5,504,172 A | 4/1996 | Imuta et al. |
| 5,756,659 A | 5/1998 | Hughes et al. |
| 5,844,045 A | 12/1998 | Kolthammer et al. |
| 5,869,575 A | 2/1999 | Kolthammer et al. |
| 5,938,437 A | 8/1999 | DeVincenzo |
| 6,051,681 A | 4/2000 | Dozeman et al. |
| 6,448,341 B1 | 9/2002 | Kolthammer et al. |
| 6,455,636 B2 | 9/2002 | Sanada et al. |
| 6,538,070 B1 | 3/2003 | Cardwell et al. |
| 6,545,088 B1 | 4/2003 | Kolthammer et al. |
| 6,566,446 B1 | 5/2003 | Parikh et al. |
| 7,070,828 B2 | 7/2006 | Sheskey et al. |
| 2005/0003193 A1 | 1/2005 | Stroppiana |
| 2005/0100754 A1 | 5/2005 | Moncla et al. |
| 2005/0192365 A1 | 9/2005 | Strandburg et al. |
| 2006/0100342 A1 | 5/2006 | Jensen |

FOREIGN PATENT DOCUMENTS

| | | |
|---|---|---|
| EP | 1486613 A1 | 12/2004 |
| EP | A-1486613 | * 12/2004 |
| WO | 97/16479 | 5/1997 |
| WO | 9716479 | 5/1997 |
| WO | WO-A-9716479 | * 5/1997 |
| WO | WO-0001745 | 1/2000 |
| WO | 2004022853 A1 | 3/2004 |
| WO | WO-A-2004/022853 | * 3/2004 |
| WO | WO-2004027593 | 4/2004 |
| WO | WO2005/021638 | * 3/2005 |
| WO | WO-2005021622 | 3/2005 |
| WO | WO-2005021638 | 3/2005 |

OTHER PUBLICATIONS

International Preliminary Report on Patentability issued in PCT Application No. US2007/019733 dated Mar. 26, 2009. (7 pages).
Official Action dated Jun. 25, 2010 issued in corresponding Russian application No. 2009113623 (7 pages).
"Feb. 2005 FIFA Quality Concept Requirements for Artificial Turf Surfaces," the FIFA handbook of test methods and requirements for artificial football turf.
Translation of Substantive Technical Examination Report issued in corresponding Argentine patent application No. P07 01 04007 (4 pages).
English Patent Abstract of WO 97/16479 from esp@cenet, published May 9, 1997 (1 page).
PCT International Search Repoert issued in PCT Application No. PCT/US2007/019733 dated Apr. 3, 2008 (3 pages).
PCT Written Opinion issued in PCT Application No. PCT/US2007/019733 dated Apr. 3, 2008 (5 pages).

(Continued)

Primary Examiner — Leszek Kiliman

(57) ABSTRACT

A polymer-coated particulate material having: a particulate substrate; and an applied compound, wherein the applied compound coats at least 50% of the surface of the particulate substrate, and wherein, at the time of application, the applied compound includes a dispersion including: a thermoplastic polymer; and a stabilizing compound. In another aspect, embodiments disclosed herein relate to a method of forming a polymer-coated particulate material, the method including the steps of: incorporating a particulate substrate and a dispersion, the dispersion comprising: a thermoplastic polymer; a stabilizing compound; and a dispersion medium selected from the group consisting of an organic solvent, water, and combinations thereof; removing at least a portion of the dispersion medium.

12 Claims, No Drawings

OTHER PUBLICATIONS

English translation of certain sections of WO1997/016479, Mailed on May 31, 2011.
Chinese Office Action with translation, CN Application No. 200780041720.0, Mailing date—Feb. 11, 2011.
Korean Office Action with translation; KR Application No. 10-2009-7007395, Mailing date—Feb. 17. 2011.
Japanese Office Action dated Apr. 19, 2011 (translation) for counterpart Japanese Application No. 2009-527460, 2 pages.
Malaysian Office Action Summary dated Apr. 12, 2011 for counterpart Malaysian Application No. PI 20090995, 1 page.
European Amendment for counterpart European Application No. 07838034.2, dated Jun. 4, 2009, 2 pages.
Chinese Office Action dated Aug. 25, 2011 for counterpart Chinese Application No. 200780041720.0, 5 pages.
Response to Chinese Office Action dated Jun. 15, 2011 for counterpart Chinese Application No. 200780041720.0, 7 pages.
Response to Japanese Office Action dated Jun. 6, 2011 for counterpart Japanese Application No. 2009-527460, 7 pages.
Response to Malaysian Office Action Summary dated Jun. 8, 2011 for counterpart Malaysian Application No. PI 20090995, 8 pages.
Response to Korean Office Action dated Apr. 7, 2011 for counterpart Korean Application No. 10-2009-7007395, 4 pages.
Response to Russian Office Action dated Aug. 19, 2010 for counterpart Russian Application No. 2009113623, 5 pages.
First Substantive Examination Report, Oct. 26, 2011, from the GCC counterpart Patent Application No. GCC/P/2007/9051 (report prepared by the State Intellectual Property Office of the P.R. China under Memorandum of Understanding between GCC and SIPO).
3rd Office Action (English translation) issued Dec. 7, 2011, from the counterpart Chinese Patent Application No. 200780041720.0 1.
Response to 3rd Office Action (English translation of amended claims) filed Feb. 21, 2012 from the counterpart Chinese Patent Application No. 200780041720.0 1.

* cited by examiner

POLYOLEFIN DISPERSION TECHNOLOGY USED FOR RESIN COATED SAND

CROSS-REFERENCE TO RELATED APPLICATIONS

This application claims priority to U.S. Provisional Patent Application No. 60/843,682, filed Sep. 11, 2006, the disclosure of which is incorporated herein by reference.

BACKGROUND OF INVENTION

1. Field of the Invention

Embodiments disclosed herein relate generally to polymer coated particulate materials. In another aspect, embodiments described herein relate to a process to produce polymer coated particulate materials. In more specific aspects, embodiments described herein relate to particulate materials such as polymer coated sands. The sands or other particulate materials may be coated or incorporated with a polymer or polymeric mixture, where the polymer or mixture of polymers may be supplied as an aqueous dispersion.

2. Background

Artificial turf consists of a multitude of artificial grass tufts extending upward from a sheet substrate. Infill material dispersed between the artificial grass tufts maintains the artificial grass tufts in an upright condition, preventing them from lying down flat or in another undesirable manner.

As one example of materials used as infill, U.S. Patent Application Publication No. 20060100342 describes infill formed by coating silica sand with either elastomeric materials or thermoplastic polymers. The infill granules are formed by first heating a portion of the silica to a temperature between 200° C. and 300° C., placing the sand in a mixer, and adding elastomer or thermoplastic polymer pellets while mixing. The thermoplastic polymer then melts, coating the sand. The contents of the mixture are then cooled using a water spray and air flowing through the mixer. The exact amount and timing of the water spray is critical to result in a free-flowing material without significant formation of agglomerates.

As another example of materials used as infill, U.S. Patent Application Publication No. 20050003193 describes infill granules formed by coating a core of recycled tire material with a plastic. The infill granules are formed by mixing the plastic and the recycled tire granules, melting the plastic, and rolling the mixture to form sheets. The sheets are cooled, solidifying the plastic, and then the sheets undergo granulation, resulting in the plastic coated recycled tire granules for use as infill.

The choice of infill material, core and coating, may greatly influence the overall characteristics of the artificial turf. Desired properties of infill include: homogeneous and complete coating of the particulate substrate, resulting in both good appearance and good wear resistance; good skid and heat resistance for long term use, avoiding compaction of the infill; soft coatings providing the desired haptics, aesthetics, and player safety; and, the infill needs to be free flowing for ease of application.

Infill materials produced as described in the patents and publication referenced above often result in infill that does not exhibit a good balance of the desired properties. In addition, the processes used may be inefficient, result in an incomplete coating of the granular material, or produce excess agglomerates.

Accordingly, there exists a need for improvements in the processes used to produce infill. It is desired to have a process that provides a lower cost with reduced waste. It is also desired to have a resin that provides a uniform, homogeneous coating, resulting in superior wear resistance, good haptics and aesthetics, and excellent player safety. Improvements are also needed in the resulting properties and the overall balance of the properties of the infill.

SUMMARY OF INVENTION

In one aspect, embodiments disclosed herein relate to a polymer-coated particulate material having: a particulate substrate; and an applied compound, wherein the applied compound coats at least 50% of the surface of the particulate substrate, and wherein, at the time of application, the applied compound includes a dispersion including: a thermoplastic polymer; and a stabilizing compound.

In another aspect, embodiments disclosed herein relate to a method of forming a polymer-coated particulate material, the method including the steps of: incorporating a particulate substrate and a dispersion, the dispersion comprising: a thermoplastic polymer; a stabilizing compound; and a dispersion medium selected from the group consisting of an organic solvent, water, and combinations thereof; removing at least a portion of the dispersion medium.

Other aspects and advantages of the invention will be apparent from the following description and the appended claims.

DETAILED DESCRIPTION

In one aspect, embodiments described herein relate to polymer coated particulate materials. In another aspect, embodiments described herein relate to a process to produce polymer coated particulate materials. In more specific aspects, embodiments described herein relate to particulate materials such as polymer coated sands. The sands or other particulate materials may be coated or incorporated with a polymer or polymeric mixture, where the polymer or mixture of polymers may be supplied as an aqueous dispersion.

Particulate Materials

The particulate materials to be coated with a polymeric shell, in some embodiments, may include mineral grains and sands. In other embodiments, the particulate materials may include silica-based sands, such as quartz sands, white sands, such as limestone-based sands, arkose, and sands that contain magnetite, chlorite, glauconite, or gypsum. In other embodiments, the mineral grains may include various fillers, such as calcium carbonate, talc, glass fibers, polymeric fibers (including nylon, rayon, cotton, polyester, and polyamide, and metal fibers. In other embodiments, the particulate materials to be coated may include rubber particles, including recycled tire.

The mineral grains and sands may range in size from 0.1 to 3 mm in some embodiments. In other embodiments, the mineral grains and sands may range in size from 0.2 to 2.5 mm; from 0.3 to 2.0 mm in other embodiments; and from 0.4 to 1.2 mm in yet other embodiments.

Dispersions

Dispersions used in accordance with embodiments disclosed herein may include a base polymer and, optionally, a stabilizing agent. In some embodiments, the dispersion may be an organic or an aqueous dispersion. In other embodiments, the dispersion may be an aqueous dispersion comprising at least one thermoplastic resin, water, optionally at least one stabilizing agent, and optionally a filler.

Base Polymer

The base polymer resin(s) contained within the dispersion composition may vary depending upon the particular application and the desired result. In one embodiment, for instance, the base polymer may be a thermoplastic resin. In particular embodiments, the thermoplastic resin may be an olefin polymer. As used herein, an olefin polymer, in general, refers to a class of polymers formed from hydrocarbon monomers having the general formula $C_nH_{2n}$. The olefin polymer may be present as a copolymer, such as an interpolymer, a block copolymer, or a multi-block interpolymer or copolymer.

In one particular embodiment, for instance, the olefin polymer may comprise an alpha-olefin interpolymer of ethylene with at least one comonomer selected from the group consisting of a $C_3$-$C_{20}$ linear, branched or cyclic diene, or an ethylene vinyl compound, such as vinyl acetate, and a compound represented by the formula $H_2C=CHR$ wherein R is a $C_1$-$C_{20}$ linear, branched or cyclic alkyl group or a $C_6$-$C_{20}$ aryl group. Examples of comonomers include propylene, 1-butene, 3-methyl-1-butene, 4-methyl-1-pentene, 3-methyl-1-pentene, 1-heptene, 1-hexene, 1-octene, 1-decene, and 1-dodecene.

In other embodiments, the thermoplastic resin may be an alpha-olefin interpolymer of propylene with at least one comonomer selected from the group consisting of ethylene, a $C_4$-$C_{20}$ linear, branched or cyclic diene, and a compound represented by the formula $H_2C=CHR$ wherein R is a $C_1$-$C_{20}$ linear, branched or cyclic alkyl group or a $C_6$-$C_{20}$ aryl group. Examples of comonomers include ethylene, 1-butene, 3-methyl-1-butene, 4-methyl-1-pentene, 3-methyl-1-pentene, 1-heptene, 1-hexene, 1-octene, 1-decene, and 1-dodecene. In some embodiments, the comonomer is present at about 5% by weight to about 25% by weight of the interpolymer. In one embodiment, a propylene-ethylene interpolymer is used.

Other examples of thermoplastic resins which may be used in the present disclosure include homopolymers and copolymers (including elastomers) of an olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene as typically represented by ethylene-butadiene copolymer and ethylene-ethylidene norbornene copolymer; and polyolefins (including elastomers) such as copolymers of two or more alpha-olefins with a conjugated or non-conjugated diene as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymers with N-methylol functional comonomers, ethylene-vinyl alcohol copolymers with N-methylol functional comonomers, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, methylstyrene-styrene copolymer; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like. These resins may be used either alone or in combinations of two or more.

In particular embodiments, polyolefins such as polypropylene, polyethylene, and copolymers thereof and blends thereof, as well as ethylene-propylene-diene terpolymers may be used. In some embodiments, the olefinic polymers include homogeneous polymers described in U.S. Pat. No. 3,645,992 by Elston; high density polyethylene (HDPE) as described in U.S. Pat. No. 4,076,698 to Anderson; heterogeneously branched linear low density polyethylene (LLDPE); heterogeneously branched ultra low linear density (ULDPE); homogeneously branched, linear ethylene/alpha-olefin copolymers; homogeneously branched, substantially linear ethylene/alpha-olefin polymers which can be prepared, for example, by a process disclosed in U.S. Pat. Nos. 5,272,236 and 5,278,272, the disclosure of which process is incorporated herein by reference; heterogeneously branched linear ethylene/alpha olefin polymers; and high pressure, free radical polymerized ethylene polymers and copolymers such as low density polyethylene (LDPE).

In another embodiment, the thermoplastic resin may include an ethylene-carboxylic acid copolymer, such as, ethylene-vinyl acetate (EVA) copolymers, ethylene-acrylic acid (EAA) and ethylene-methacrylic acid copolymers such as, for example, those available under the tradenames PRIMACOR™ from the Dow Chemical Company, NUCREL™ from DuPont, and ESCOR™ from ExxonMobil, and described in U.S. Pat. Nos. 4,599,392, 4,988,781, and 5,384,373, each of which is incorporated herein by reference in its entirety. Exemplary polymers include polypropylene, (both impact modifying polypropylene, isotactic polypropylene, atactic polypropylene, and random ethylene/propylene copolymers), various types of polyethylene, including high pressure, free-radical LDPE, Ziegler Natta LLDPE, metallocene PE, including multiple reactor PE ("in reactor") blends of Ziegler-Natta PE and metallocene PE, such as products disclosed in U.S. Pat. Nos. 6,545,088, 6,538,070, 6,566,446, 5,844,045, 5,869,575, and 6,448,341. Homogeneous polymers such as olefin plastomers and elastomers, ethylene and propylene-based copolymers (for example polymers available under the trade designation VERSIFY™ available from The Dow Chemical Company and VISTAMAXX™ available from ExxonMobil) may also be useful in some embodiments. Of course, blends of polymers may be used as well. In some embodiments, the blends include two different Ziegler-Natta polymers. In other embodiments, the blends may include blends of a Ziegler-Natta and a metallocene polymer. In still other embodiments, the thermoplastic resin used herein may be a blend of two different metallocene polymers.

In one particular embodiment, the thermoplastic resin may comprise an alpha-olefin interpolymer of ethylene with a comonomer comprising an alkene, such as 1-octene. The ethylene and octene copolymer may be present alone or in combination with another thermoplastic resin, such as ethylene-acrylic acid copolymer. When present together, the weight ratio between the ethylene and octene copolymer and the ethylene-acrylic acid copolymer may be from about 1:10 to about 10:1, such as from about 3:2 to about 2:3. The polymeric resin, such as the ethylene-octene copolymer, may have a crystallinity of less than about 50%, such as less than about 25%.

Embodiments disclosed herein may also include a polymeric component that may include at least one multi-block olefin interpolymer. Suitable multi-block olefin interpolymers may include those described in U.S. Provisional Patent Application No. 60/818,911, for example. The term "multi-block copolymer" or refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of polydispersity index (PDI or $M_w/M_n$), block length distribution, and/or block number distribution due to the unique process making of the copolymers. More specifically, when produced in a continuous process, embodiments of the polymers may possess a PDI ranging from about 1.7 to about 8; from about 1.7 to about 3.5 in other embodiments; from about 1.7 to about 2.5 in other embodiments; and from about 1.8 to about 2.5 or from about 1.8 to about 2.1 in yet other embodiments. When produced in a batch or semi-batch process, embodiments of the polymers may possess a PDI ranging from about 1.0 to about 2.9; from about 1.3 to about 2.5 in other embodiments; from about 1.4 to about 2.0 in other embodiments; and from about 1.4 to about 1.8 in yet other embodiments.

One example of the multi-block olefin interpolymer is an ethylene/α-olefin block interpolymer. Another example of the multi-block olefin interpolymer is a propylene/α-olefin interpolymer. The following description focuses on the interpolymer as having ethylene as the majority monomer, but applies in a similar fashion to propylene-based multi-block interpolymers with regard to general polymer characteristics.

The ethylene/α-olefin multi-block interpolymers may comprise ethylene and one or more co-polymerizable α-olefin comonomers in polymerized form, characterized by multiple (i.e., two or more) blocks or segments of two or more polymerized monomer units differing in chemical or physical properties (block interpolymer), preferably a multi-block interpolymer. In some embodiments, the multi-block interpolymer may be represented by the following formula:

(AB)$_n$ where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. Preferably, A's and B's are linked in a linear fashion, not in a branched or a star fashion. "Hard" segments refer to blocks of polymerized units in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all or substantially all ethylene. "Soft" segments, on the other hand, refer to blocks of polymerized units in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 eight percent, greater than 30 weight percent, greater than 35 weight percent, greater than 40 weight percent, greater than 45 weight percent, greater than 50 weight percent, or greater than 60 weight percent in various other embodiments.

In some embodiments, A blocks and B blocks are randomly distributed along the polymer chain. In other words, the block copolymers do not have a structure like:

AAA-AA-BBB-BB

In other embodiments, the block copolymers do not have a third block. In still other embodiments, neither block A nor block B comprises two or more segments (or sub-blocks), such as a tip segment.

The multi-block interpolymers may be characterized by an average block index, ABI, ranging from greater than zero to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$ABI=\Sigma(w_i BI_i)$ where $BI_i$ is the block index for the $i^{th}$ fraction of the multi-block interpolymer obtained in preparative TREF, and $w_i$ is the weight percentage of the $i^{th}$ fraction.

Similarly, the square root of the second moment about the mean, hereinafter referred to as the second moment weight average block index, may be defined as follows:

$$2^{nd} \text{ moment weight average } BI = \sqrt{\frac{\Sigma(w_i(BI_i - ABI)^2)}{\frac{(N-1)\Sigma w_i}{N}}}$$

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the analytical temperature rising elution fractionation (ATREF) elution temperature for the $i^{th}$ fraction (preferably expressed in Kelvin), $P_X$ is the ethylene mole fraction for the $i^{th}$ fraction, which may be measured by NMR or IR as described below. $P_{AB}$ is the ethylene mole fraction of the whole ethylene/α-olefin interpolymer (before fractionation), which also may be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the multi-block interpolymer. $T_{AB}$ may be calculated from the mole fraction of ethylene (measured by NMR) using the following equation:

$Ln\ P_{AB}=\alpha/T_{AB}+\beta$ where α and β are two constants which may be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$Ln\ P = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition and having an ethylene mole fraction of $P_X$. $T_{XO}$ may be calculated from $LnP_X = \alpha/T_{XO} + \beta$. Conversely, $P_{XO}$ is the ethylene mole fraction for a random copolymer of the same composition and having an ATREF temperature of $T_X$, which may be calculated from $Ln\ P_{XO} = \alpha/T_X + \beta$.

Once the block index (BI) for each preparative TREF fraction is obtained, the weight average block index, ABI, for the whole polymer may be calculated. In some embodiments, ABI is greater than zero but less than about 0.4 or from about 0.1 to about 0.3. In other embodiments, ABI is greater than about 0.4 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the multi-block interpolymer is that the interpolymer may comprise at least one polymer fraction which may be obtained by preparative TREF, wherein the fraction has a block index greater than about 0.1 and up to about 1.0 and the polymer having a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

Ethylene α-olefin multi-block interpolymers used in embodiments of the invention may be interpolymers of ethylene with at least one $C_3$-$C_{20}$ α-olefin. The interpolymers may further comprise $C_4$-$C_{18}$ diolefin and/or alkenylbenzene.

Suitable unsaturated comonomers useful for polymerizing with ethylene include, for example, ethylenically unsaturated monomers, conjugated or non-conjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred.

Other suitable monomers include styrene, halo- or alkyl-substituted styrenes, vinylbenzocyclobutane, 1,4-hexadiene, 1,7-octadiene, and naphthenics (such as cyclopentene, cyclohexene, and cyclooctene, for example).

The multi-block interpolymers disclosed herein may be differentiated from conventional, random copolymers, physical blends of polymers, and block copolymers prepared via sequential monomer addition, fluxional catalysts, and anionic or cationic living polymerization techniques. In particular, compared to a random copolymer of the same monomers and monomer content at equivalent crystallinity or modulus, the interpolymers have better (higher) heat resistance as measured by melting point, higher TMA penetration temperature, higher high-temperature tensile strength, and/or higher high-temperature torsion storage modulus as determined by dynamic mechanical analysis. Properties of infill may benefit from the use of embodiments of the multi-block interpolymers, as compared to a random copolymer containing the same monomers and monomer content, the multi-block interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

Other olefin interpolymers include polymers comprising monovinylidene aromatic monomers including styrene, o-methyl styrene, p-methyl styrene, t-butylstyrene, and the like. In particular, interpolymers comprising ethylene and styrene may be used. In other embodiments, copolymers comprising ethylene, styrene and a $C_3$-$C_{20}$ α olefin, optionally comprising a $C_4$-$C_{20}$ diene, may be used.

Suitable non-conjugated diene monomers may include straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched c h a in acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD).

One class of desirable polymers that may be used in accordance with embodiments disclosed herein includes elastomeric interpolymers of ethylene, a $C_3$-$C_{20}$ α-olefin, especially propylene, and optionally one or more diene monomers. Preferred α-olefins for use in this embodiment are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

The polymers (homopolymers, copolymers, interpolymers and multi-block interpolymers) described herein may have a melt index, I2, from 0.01 to 2000 g/10 minutes in some embodiments; from 0.01 to 1000 g/10 minutes in other embodiments; from 0.01 to 500 g/10 minutes in other embodiments; and from 0.01 to 100 g/10 minutes in yet other embodiments. In certain embodiments, the polymers may have a melt index, I2, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the polymers may be approximately 1 g/10 minutes, 3 g/10 minutes or 5 g/10 minutes.

The polymers described herein may have molecular weights, $M_w$, from 1,000 g/mole to 5,000,000 g/mole in some embodiments; from 1000 g/mole to 1,000,000 in other embodiments; from 10,000 g/mole to 500,000 g/mole in other embodiments; and from 10,000 g/mole to 300,000 g/mole in yet other embodiments. The density of the polymers described herein may be from 0.80 to 0.99 $g/cm^3$ in some embodiments; for ethylene containing polymers from 0.85 $g/cm^3$ to 0.97 $g/cm^3$. In certain embodiments, the density of the ethylene/α-olefin polymers may range from 0.860 to 0.925 $g/cm^3$ or 0.867 to 0.910 $g/cm^3$.

In some embodiments, the polymers described herein may have a tensile strength above 10 MPa; a tensile strength $\geq 11$ MPa in other embodiments; and a tensile strength $\geq 13$ MPa in yet other embodiments. In some embodiments, the polymers described herein may have an elongation at break of at least 600 percent at a crosshead separation rate of 11 cm/minute; at least 700 percent in other embodiments; at least 800 percent in other embodiments; and at least 900 percent in yet other embodiments.

In some embodiments, the polymers described herein may have a storage modulus ratio, $G'(25° C.)/G'(100° C.)$, from 1 to 50; from 1 to 20 in other embodiments; and from 1 to 10 in yet other embodiments. In some embodiments, the polymers may have a 70° C. compression set of less than 80 percent; less than 70 percent in other embodiments; less than 60 percent in other embodiments; and, less than 50 percent, less than 40 percent, down to a compression set of 0 percent in yet other embodiments.

In some embodiments, the ethylene/α-olefin interpolymers may have a heat of fusion of less than 85 J/g. In other embodiments, the ethylene/α-olefin interpolymer may have a pellet blocking strength of equal to or less than 100 pounds/$foot^2$ (4800 Pa); equal to or less than 50 $lbs/ft^2$ (2400 Pa) in other embodiments; equal to or less than 5 $lbs/ft^2$ (240 Pa), and as low as 0 $lbs/ft^2$ (0 Pa) in yet other embodiments.

In some embodiments, block polymers made with two catalysts incorporating differing quantities of comonomer may have a weight ratio of blocks formed thereby ranging from 95:5 to 5:95. The elastomeric interpolymers, in some embodiments, have an ethylene content of from 20 to 90 percent, a diene content of from 0.1 to 10 percent, and an α-olefin content of from 10 to 80 percent, based on the total weight of the polymer. In other embodiments, the multi-block elastomeric polymers have an ethylene content of from 60 to 90 percent, a diene content of from 0.1 to 10 percent, and an α-olefin content of from 10 to 40 percent, based on the total weight of the polymer. In other embodiments, the interpolymer may have a Mooney viscosity (ML (1+4) 125° C.) ranging from 1 to 250. In other embodiments, such polymers may have an ethylene content from 65 to 75 percent, a diene content from 0 to 6 percent, and an α-olefin content from 20 to 35 percent.

In certain embodiments, the polymer may be a propylene-ethylene copolymer or interpolymer having an ethylene content between 5 and 20% by weight and a melt flow rate (230° C. with 2.16 kg weight) from 0.5 to 300 g/10 min. In other embodiments, the propylene-ethylene copolymer or interpolymer may have an ethylene content between 9 and 12% by weight and a melt flow rate (230° C. with 2.16 kg weight) from 1 to 100 g/10 min.

In some particular embodiments, the polymer is a propylene-based copolymer or interpolymer. In certain embodiments, the propylene-based copolymer may be a propylene-α olefin copolymer. In some embodiments, a propylene/ethylene copolymer or interpolymer is characterized as having substantially isotactic propylene sequences. The term "substantially isotactic propylene sequences" and similar terms mean that the sequences have an isotactic triad (mm) measured by $^{13}C$ NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain as determined by $^{13}C$ NMR spectra. In other particular embodiments, the ethylene-α olefin copolymer may be ethylene-butene, ethylene-hexene, or ethylene-octene copolymers or interpolymers. In other particular embodiments, the propylene-α olefin copolymer may be a propylene-ethylene or a propylene-ethylene-butene copolymer or interpolymer.

The polymers described herein (homopolymers, copolymers, interpolymers, multi-block interpolymers) may be produced using a single site catalyst and may have a weight average molecular weight of from about 15,000 to about 5 million, such as from about 20,000 to about 1 million. The molecular weight distribution of the polymer may be from about 1.01 to about 80, such as from about 1.5 to about 40, such as from about 1.8 to about 20.

The resin may also have a relatively low melting point in some embodiments. For instance, the melting point of the polymers described herein may be less than about 160° C., such as less than 130° C., such as less than 120° C. For instance, in one embodiment, the melting point may be less than about 100° C.; in another embodiment, the melting point may be less than about 90° C.; less than 80° C. in other embodiments; and less than 70° C. in yet other embodiments. The glass transition temperature of the polymer resin may also be relatively low. For instance, the glass transition temperature may be less than about 50° C., such as less than about 40° C.

In some embodiments, the polymer may have a Shore A hardness from 30 to 100. In other embodiments, the polymer may have a Shore A hardness from 40 to 90; from 30 to 80 in other embodiments; and from 40 to 75 in yet other embodiments.

The olefin polymers, copolymers, interpolymers, and multi-block interpolymers may be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an olefin polymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of which are incorporated herein by reference in their entirety. One particularly useful functional group is maleic anhydride.

The amount of the functional group present in the functional polymer may vary. The functional group may be present in an amount of at least about 1.0 weight percent in some embodiments; at least about 5 weight percent in other embodiments; and at least about 7 weight percent in yet other embodiments. The functional group may be present in an amount less than about 40 weight percent in some embodiments; less than about 30 weight percent in other embodiments; and less than about 25 weight percent in yet other embodiments.

Stabilizing Agent

Embodiments disclosed herein may use one or more stabilizing agents to promote the formation of a stable dispersion or emulsion. In some embodiments, the stabilizing agent may be a surfactant, dispersing agent, emulsifier, or a polymer (different from the base polymer detailed above), or mixtures thereof. In certain embodiments, the polymer may be a polar polymer, having a polar group as either a comonomer or grafted monomer. In preferred embodiments, the stabilizing agent comprises one or more polar polyolefins, having a polar group as either a comonomer or grafted monomer. Typical polymers include ethylene-acrylic acid (EAA) and ethylene-methacrylic acid copolymers, such as those available under the trademarks PRIMACOR™ (trademark of The Dow Chemical Company), NUCREL™ (trademark of E.I. DuPont de Nemours), and ESCOR™ (trademark of ExxonMobil) and described in U.S. Pat. Nos. 4,599,392, 4,988,781, and 5,938,437, each of which is incorporated herein by reference in its entirety. Other polymers include ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

In general, any suitable stabilizing agent can be used. In one embodiment, for instance, the stabilizing agent comprises at least one carboxylic acid, a salt of at least one carboxylic acid, or carboxylic acid ester or salt of the carboxylic acid ester. Examples of carboxylic acids useful as a dispersant comprise fatty acids such as montanic acid, stearic acid, oleic acid, and the like. In some embodiments, the carboxylic acid, the salt of the carboxylic acid, or at least one carboxylic acid fragment of the carboxylic acid ester or at least one carboxylic acid fragment of the salt of the carboxylic acid ester has fewer than 25 carbon atoms. In other embodiments, the carboxylic acid, the salt of the carboxylic acid, or at least one carboxylic acid fragment of the carboxylic acid ester or at least one carboxylic acid fragment of the salt of the carboxylic acid ester has 12 to 25 carbon atoms. In some embodiments, carboxylic acids, salts of the carboxylic acid, at least one carboxylic acid fragment of the carboxylic acid ester or its salt has 15 to 25 carbon atoms are preferred. In other embodiments, the number of carbon atoms is 25 to 60. Some examples of salts comprise a cation selected from the group consisting of an alkali metal cation, alkaline earth metal cation, or ammonium or alkyl ammonium cation.

Other surfactants that may be used include long chain fatty acids or fatty acid salts having from 12 to 60 carbon atoms. In other embodiments, the long chain fatty acid or fatty acid salt may have from 12 to 40 carbon atoms.

If the polar group of the polymer is acidic or basic in nature, the stabilizing polymer may be partially or fully neutralized with a neutralizing agent to form the corresponding salt. In certain embodiments, neutralization of the stabilizing agent, such as a long chain fatty acid or EAA, may be from 25 to 200% on a molar basis; from 50 to 110% on a molar basis in other embodiments. For example, for EAA, the neutralizing agent is a base, such as ammonium hydroxide or potassium hydroxide, for example. Other neutralizing agents may include lithium hydroxide or sodium hydroxide, for example. Those having ordinary skill in the art will appreciate that the selection of an appropriate neutralizing agent depends on the specific composition formulated, and that such a choice is within the knowledge of those of ordinary skill in the art.

Additional surfactants that may be useful in the practice of the present invention include cationic surfactants, anionic surfactants, or non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants. Surfactants useful in the practice of the present invention may be either external surfactants or internal surfactants. External surfactants are surfactants that do not become chemically reacted into the polymer during dispersion preparation. Examples of external surfactants useful herein include salts of dodecyl benzene sulfonic acid and lauryl sulfonic acid salt. Internal surfactants are surfactants that do become chemically reacted into the polymer during dispersion preparation. An example of an internal surfactant useful herein includes 2,2-dimethylol propionic acid and its salts.

In particular embodiments, the stabilizing agent or stabilizing agent may be used in an amount ranging from greater than zero to about 60% by weight based on the amount of base polymer (or base polymer mixture) used. For example, long chain fatty acids or salts thereof may be used in an amount ranging from 0.5 to 10% by weight based on the amount of base polymer. In other embodiments, ethylene-acrylic acid or ethylene-methacrylic acid copolymers may be used in an amount from 0.5 to 60% by weight based on polymer. In yet other embodiments, sulfonic acid salts may be used in an amount from 0.5 to 10% by weight based on the amount of base polymer.

The type and amount of stabilizing agent used may also affect end properties of the article formed incorporating the dispersion. For example, articles having improved oil and grease resistance might incorporate a surfactant package having ethylene-acrylic acid copolymers or ethylene-methacrylic acid copolymers in an amount from about 10 to about 50% by weight based on the total amount of base polymer. A similar surfactant package may be used when improved strength or softness is a desired end property. As another example, articles having improved water or moisture resistance might incorporate a surfactant package utilizing long chain fatty acids in an amount from 0.5 to 5%, or ethylene-acrylic acid copolymers in an amount from 10 to 50%, both by weight based on the total amount of base polymer. In other embodiments, the minimum amount of surfactant or stabilizing agent must be at least 1% by weight based on the total amount of base polymer.

In other embodiments, the stabilizing agent is selected from alkyl ether carboxylates, petroleum sulfonates, sulfonated polyoxyethylenated alcohol, sulfated or phosphated polyoxyethylenated alcohols, polymeric ethylene oxide/propylene oxide/ethylene oxide stabilizing agents, primary and secondary alcohol ethoxylates, alkyl glycosides and alkyl glycerides.

When ethylene-acrylic acid copolymer is used as a stabilizing agent, the copolymer may also serve as a thermoplastic resin. In one particular embodiment, the aqueous dispersion contains an ethylene and octene copolymer, ethylene-acrylic acid copolymer, and a fatty acid, such as stearic acid or oleic acid. The stabilizing agent, such as the carboxylic acid, may be present in the aqueous dispersion in an amount from about 0.1% to about 10% by weight.

Additives

Additives may be combined with the dispersion, or with the base polymer, stabilizing agent, or filler used in the dispersion, without deviating from the scope of the present invention. For example, additives may include a wetting agent, fire retardants, surfactants, anti-static agents, antifoam agent, anti block, wax-dispersion, pigments, a neutralizing agent, a thickener, a compatibilizer, a brightener, a rheology modifier, a biocide, a fungicide, reinforcing fibers, and other additives known to those skilled in the art. While optional for purposes of the present invention, other components may be highly advantageous for product stability during and after the manufacturing process.

Additives and adjuvants may be included in any formulation comprising the above described polymers, copolymers, interpolymers, and multi-block interpolymers. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers according to embodiments of the invention. Thermoplastic compositions according to other embodiments of the invention may also contain organic or inorganic fillers or other additives such as starch, talc, calcium carbonate, glass fibers, polymeric fibers (including nylon, rayon, cotton, polyester, and polyaramide), metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes, wollastonite, graphite, zeolites, and ceramics, such as silicon carbide, silicon nitride or titania. Silane-based or other coupling agents may also be employed for better filler bonding.

Polymers suitable for blending with the above described polymers include thermoplastic and non-thermoplastic polymers including natural and synthetic polymers. Exemplary polymers for blending include ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes.

Suitable conventional block copolymers which may be blended with the polymers disclosed herein may possess a Mooney viscosity (ML 1+4 @ 100° C.) in the range from 10 to 135 in some embodiments; from 25 to 100 in other embodiments; and from 30 to 80 in yet other embodiments. Suitable polyolefins especially include linear or low density polyethylene, polypropylene (including atactic, isotactic, syndiotactic and impact modified versions thereof) and poly(4-methyl-1-pentene). Suitable styrenic polymers include polystyrene, rubber modified polystyrene (HIPS), styrene/acrylonitrile copolymers (SAN), rubber modified SAN (ABS or AES) and styrene maleic anhydride copolymers.

The blend compositions may contain processing oils, plasticizers, and processing aids. Rubber processing oils having a certain ASTM designation and paraffinic, napthenic or aromatic process oils are all suitable for use. Generally from 0 to 150 parts, more preferably 0 to 100 parts, and most preferably from 0 to 50 parts of processing oils, plasticizers, and/or processing aids per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly)glycol esters, and metal salt-, especially Group 1 or 2 metal or zinc-, salt derivatives thereof.

For conventional TPO, TPV, and TPE applications, carbon black is one additive useful for UV absorption and stabilizing properties. Representative examples of carbon blacks include ASTM N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and average pore volumes ranging from 10 to 150 $cm^3/100$ g. Generally, smaller particle sized carbon blacks are employed, to the extent cost considerations permit. For many such applications the present polymers and blends thereof require little or no carbon black, thereby allowing considerable design freedom to include alternative pigments or no pigments at all.

Compositions, including thermoplastic blends according to embodiments of the invention may also contain anti-ozonants or anti-oxidants that are known to a rubber chemist of ordinary skill. The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl) phenol, p-phenylenediamines, butylated reaction products of p-cresol and dicyclopentadiene (DCPD), polyphenolic anitioxidants, hydroquinone derivatives, quinoline, diphenylene antioxidants, thioester antioxidants, and blends thereof. Some representative trade names of such products are WINGSTAY™ S antioxidant, POLYSTAY™ 100 antioxidant, POLYSTAY™ 100 AZ antioxidant, POLYSTAY™ 200 antioxidant, WINGSTAY™ L antioxidant, WINGSTAY™ LHLS antioxidant, WINGSTAY™ K antioxidant, WINGSTAY™ 29 antioxidant, WINGSTAY™ SN-1 antioxidant, and IRGANOX™ antioxidants. In some applications, the anti-oxidants and anti-ozonants used will preferably be non-staining and non-migratory.

For providing additional stability against UV radiation, hindered amine light stabilizers (HALS) and UV absorbers may be also used. Suitable examples include TINUVIN™ 123, TINUVIN™ 144, TINUVIN™ 622, TINUVIN™ 765, TINUVIN™ 770, and TINUVIN™ 780, available from Ciba Specialty Chemicals, and CHEMISORB™ T944, available from Cytex Plastics, Houston Tex., USA. A Lewis acid may be additionally included with a HALS compound in order to achieve superior surface quality, as disclosed in U.S. Pat. No. 6,051,681. Other embodiments may include a heat stabilizer, such as IRGANOX™ PS 802 FL, for example.

For some compositions, additional mixing processes may be employed to pre-disperse the heat stabilizers, anti-oxidants, anti-ozonants, carbon black, UV absorbers, and/or light stabilizers to form a masterbatch, and subsequently to form polymer blends therefrom.

Suitable crosslinking agents (also referred to as curing or vulcanizing agents) for use herein include sulfur based, peroxide based, or phenolic based compounds. Examples of the foregoing materials are found in the art, including in U.S. Pat. Nos. 3,758,643, 3,806,558, 5,051,478, 4,104,210, 4,130,535, 4,202,801, 4,271,049, 4,340,684, 4,250,273, 4,927,882, 4,311,628 and 5,248,729.

When sulfur based curing agents are employed, accelerators and cure activators may be used as well. Accelerators are used to control the time and/or temperature required for dynamic vulcanization and to improve the properties of the resulting cross-linked article. In one embodiment, a single accelerator or primary accelerator is used. The primary accelerator(s) may be used in total amounts ranging from about 0.5 to about 4, preferably about 0.8 to about 1.5 phr, based on total composition weight. In another embodiment, combinations of a primary and a secondary accelerator might be used with the secondary accelerator being used in smaller amounts, such as from about 0.05 to about 3 phr, in order to activate and to improve the properties of the cured article. Combinations of accelerators generally produce articles having properties that are somewhat better than those produced by use of a single accelerator. In addition, delayed action accelerators may be used which are not affected by normal processing temperatures yet produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and ZnO may also be used. When peroxide based curing agents are used, co-activators or coagents may be used in combination therewith. Suitable coagents include trimethylolpropane triacrylate (TMPTA), trimethylolpropane trimethacrylate (TMPTMA), triallyl cyanurate (TAC), triallyl isocyanurate (TAIC), among others. Use of peroxide crosslinkers and optional coagents used for partial or complete dynamic vulcanization are known in the art and disclosed for example in the publication, "Peroxide Vulcanization of Elastomer", Vol. 74, No 3, July-August 2001.

When the polymer composition is at least partially crosslinked, the degree of crosslinking may be measured by dissolving the composition in a solvent for specified duration, and calculating the percent gel or unextractable component. The percent gel normally increases with increasing crosslinking levels. For cured articles according to embodiments of the invention, the percent gel content is desirably in the range from 5 to 100 percent.

In some embodiments, additives may also include perfumes, algae inhibitors, anti-microbiological and anti-fungus agents, flame retardants and halogen-free flame retardants, as well as slip and anti-block additives. Other embodiments may include PDMS to decrease the abrasion resistance of the polymer. Adhesion of the polymer to the sand may also be improved through the use of adhesion promoters or functionalization or coupling of the polymer with organosilane, polychloroprene (neoprene), or other grafting agents.

Overall Dispersion Characteristics/Properties

In addition to the above components, the aqueous dispersion also contains water. Water may be added as deionized water, if desired. The pH of the aqueous dispersion is generally less than about 12, such as from about 5 to about 11.5, such as from about 7 to about 11. The aqueous dispersion may have a solids content of less than about 75%, such as less than about 70%. For instance, the solids content of the aqueous dispersion may range from about 5% to about 60%. In general, the solids content can be varied depending upon the manner in which the additive composition is applied or incorporated with the particulate substrate.

Dispersions, both aqueous and non-aqueous, may be formed using the polymers described above or formulations comprising the same. Aqueous dispersions, for example, may be formed using a base polymer, as described above, a stabilizing agent, and water. Non-aqueous dispersions, for example, may be formed using a base polymer, a stabilizing agent, and an organic solvent, where the organic solvent may include low-boiling point (<100° C.) organic compounds, such as toluene, methylene chloride, and other common organic solvents known to those skilled in the art.

Frothed foams comprising the polymers may also be formed, as disclosed in PCT application No. PCT/US2004/027593, filed Aug. 25, 2004, and published as WO2005/021622. The polymers may also be crosslinked by any known means, such as the use of peroxide, electron beam, silane, azide, gamma irradiation or other cross-linking techniques. The polymers may also be chemically modified, such as by grafting (for example by use of maleic anhydride (MAH), silanes, or other grafting agent), halogenation, amination, sulfonation, or other chemical modification.

Dispersions formed in accordance with embodiments disclosed herein may include: a base polymer, which may comprise at least one olefin polymer; and a stabilizing agent, which may comprise at least one polar polyolefin. The olefin polymer, in some embodiments, may be propylene-based homopolymer, copolymer, interpolymer, and multi-block interpolymer. In other embodiments, the olefin polymer may be an ethylene-based homopolymer, copolymer, interpolymer, and multi-block interpolymer. In other embodiments, the olefin polymer may be a combination of one or more olefin polymers described herein.

With respect to the base polymer and the stabilizing agent, in some embodiments, the base polymer may comprise between about 30 percent to about 99 percent by weight of the total amount of base polymer and stabilizing agent in the composition. In other embodiments, the base polymer may comprise between about 50 percent and about 90 percent of the total amount of base polymer and stabilizing agent in the composition. In yet other embodiments, the one or more base polymers may comprise between about 60 percent and about 80 percent of the total amount of base polymer and stabilizing agent in the composition.

The one or more olefin resins may be contained within the aqueous dispersion in an amount from about 1 percent by weight to about 96 percent by weight. In some embodiments, the olefin polymer may be present in the aqueous dispersion in an amount from about 10 percent by weight to about 80 percent by weight. In other embodiments, the olefin polymer may be present in an amount from about 20 percent to about 70 percent by weight; and, from about 30 percent to about 60 weight percent by weight in yet other embodiments.

Dispersions formed in accordance with embodiments disclosed herein may include: a base polymer, which may include at least one olefin polymer as described above; a secondary polymeric component, which may include at least one thermoplastic polyolefin; and a stabilizing agent. The at least one olefin polymer, in some embodiments, may comprise from about 30 percent to 95 percent by weight of the total amount of base polymer, secondary polymer, and stabilizing agent in the composition. In other embodiments, the at least one olefin polymer may comprise between about 50 percent and about 80 percent by weight; and, between about 60 percent to about 70 percent by weight in yet other embodiments. In some embodiments, the secondary polymeric component may comprise from 1 to 48 percent by weight of the total amount of base polymer, secondary polymer, and stabilizing agent in the composition. In other embodiments, the secondary polymeric component may comprise from 5 to 30 percent by weight; and from 10 to 25 percent by weight in yet other embodiments.

Benefits derived from an olefin polymer may also be realized where the polymer is used as a minority component in a dispersion. Accordingly, dispersions formed in accordance with other embodiments disclosed herein may include: a base polymer, which may include at least one thermoplastic polyolefin; a secondary polymeric component, which may include at least one olefin polymer or interpolymer as described above; and a stabilizing agent. The base polymer, in some embodiments, may comprise from about 30 percent to 95 percent by weight of the total amount of base polymer, olefin polymer or interpolymer, and stabilizing agent in the composition. In other embodiments, the base polymer may comprise between about 50 percent and about 80 percent by weight; and, between about 60 percent to about 70 percent by weight in yet other embodiments. In other embodiments, the olefin polymer component may comprise from 1 to 48 percent by weight of the total amount of base polymer, olefin polymer, and stabilizing agent in the composition. In other embodiments, the olefin polymer component may comprise from 5 to 30 percent by weight; and from 10 to 25 percent by weight in yet other embodiments.

With respect to the filler, typically, an amount greater than about 0 to about 1000 parts per hundred of the polymer (polymer meaning here the base polymer combined with the thermoplastic polymer (if any) and the stabilizing agent) is used. In selected embodiments, between about 50 to 250 parts per hundred are used. In other selected embodiments, between about 10 to 500 parts per hundred are used. In still other embodiments, from between about 20 to 400 parts per hundred are used. In other embodiments, from about 0 to about 200 parts per hundred are used.

The solid materials (base polymer plus thermoplastic polymer (if any) plus stabilizing agent) are preferably dispersed in a liquid medium, which in preferred embodiments is water. In preferred embodiments, sufficient neutralization agent is added to neutralize the resultant dispersion to achieve a pH range of between about 4 to about 14. In preferred embodiments, sufficient base is added to maintain a pH of between about 6 to about 11; in other embodiments, the pH may be between about 8 to about 10.5. Water content of the dispersion is preferably controlled so that the solids content is between about 1% to about 74% by volume. In another embodiment, the solid content is between about 25% to about 74% by volume. In particular embodiments, the solids range may be between about 10% to about 70% by weight. In other particular embodiments, the solids range is between about 20% to about 60% by weight. In particularly preferred embodiments, the solids range is between about 30% to about 55% by weight.

Dispersions formed in accordance with embodiments of the present invention are characterized in having an average particle size of between about 0.1 to about 5.0 microns. In other embodiments, dispersions have an average particle size of from about 0.5 µm to about 2.7 µm. In other embodiments, from about 0.8 µm to about 1.2 µm. By "average particle size", the present invention means the volume-mean particle size. In order to measure the particle size, laser-diffraction techniques may be employed for example. A particle size in this description refers to the diameter of the polymer in the dispersion. For polymer particles that are not spherical, the diameter of the particle is the average of the long and short axes of the particle. Particle sizes may be measured on a Beckman-Coulter LS230 laser-diffraction particle size analyzer or other suitable device. The particle size distribution of the polymer particles in the dispersion may be less than or equal to about 2.0, such as less than 1.9, 1.7 or 1.5.

In addition, embodiments of the present invention optionally include a filler wetting agent. A filler wetting agent generally may help make the filler and the polyolefin dispersion more compatible. Useful wetting agents include phosphate salts, such as sodium hexametaphosphate. A filler wetting agent may be included in a composition of the present invention at a concentration of at least about 0.5 parts per 100 parts of filler, by weight.

Furthermore, embodiments of the present invention may optionally include a thickener. Thickeners may be useful in the present invention to increase the viscosity of low viscosity dispersions. Thickeners suitable for use in the practice of the present invention may be any known in the art such as for instance polyacrylate type or associated non ionic thickeners such as modified cellulose ethers. For example, suitable thickeners include ALCOGUM™ VEP-II (trademark of Alco Chemical Corporation), RHEOVIS™ and VISCALEX™ (trademarks of Ciba Ceigy), UCAR™ Thickener 146, or ETHOCEL™ or METHOCEL™ (trademarks of the The Dow Chemical Company) and PARAGUM™ 241 (trademarks of Para-Chem Southern, Inc.), or BERMACOL™ (trademark of Akzo Nobel) or AQUALON™ (trademark of Hercules) or ACUSOL® (trademark of Rohm and Haas). Thickeners may be used in any amount necessary to prepare a dispersion of desired viscosity.

The ultimate viscosity of the dispersion is, therefore, controllable. Addition of the thickener to the dispersion including the amount of filler may be done with conventional means to result in viscosities as needed. Viscosities of thus dispersions may reach +3000 cP (Brookfield spindle 4 with 20 rpm) with moderate thickener dosing (up to 4% preferably, below 3% based on 100 phr of polymer dispersion). The starting polymer dispersion as described has an initial viscosity prior to formulation with fillers and additives between 20 and 1000 cP (Brookfield viscosity measured at room temperature with spindle RV3 at 50 rpm). Still more preferably, the starting viscosity of the dispersion may be between about 100 to about 600 cP.

Also, embodiments of the present invention are characterized by their stability when a filler is added to the polymer/stabilizing agent. In this context, stability refers to the stability of viscosity of the resultant aqueous polyolefin dispersion. In order to test the stability, the viscosity is measured over a period of time. Preferably, viscosity measured at 20° C. should remain +/−10% of the original viscosity over a period of 24 hours, when stored at ambient temperature.

Examples of aqueous dispersions that may be incorporated into embodiments of the present disclosure are disclosed, for instance, in U.S. Patent Application Publication No. 2005/0100754, U.S. Patent Application Publication No. 2005/0192365, PCT Publication No. WO 2005/021638, and PCT Publication No. WO 2005/021622, which are all incorporated herein by reference.

Dispersion Formation

Dispersions used in embodiments disclosed herein may be formed by any number of methods recognized by those having skill in the art. In selected embodiments, the dispersions may be formed by using techniques, for example, in accordance with the procedures as described in WO2005021638, which is incorporated by reference in its entirety.

While any method may be used to produce the aqueous dispersion, in one embodiment, the dispersion may be formed through a melt-kneading process. For example, the kneader may comprise a BANBURY® mixer, single-screw extruder or a multi-screw extruder. The melt-kneading may be conducted under the conditions which are typically used for melt-kneading the one or more thermoplastic resins.

In one particular embodiment, the process includes melt-kneading the components that make up the dispersion. The melt-kneading machine may include multiple inlets for the various components. For example, the extruder may include four inlets placed in series. Further, if desired, a vacuum vent may be added at an optional position of the extruder.

In a specific embodiment, a base polymer, a stabilizing agent, and optionally a filler are melt-kneaded in an extruder along with water and a neutralizing agent, such as ammonia, potassium hydroxide, or a combination of the two to form a dispersion. Those having ordinary skill in the art will recognize that a number of other neutralizing agents may be used. In some embodiments, the filler may be added after blending the base polymer and stabilizing agent. In some embodiments, the dispersion is first diluted to contain about 1 to about 3% by weight water and then, subsequently, further diluted to comprise greater than about 25% by weight water.

Any melt-kneading means known in the art may be used. In some embodiments, a kneader, a BANBURY® mixer, single-screw extruder, or a multi-screw extruder is used. A process for producing the dispersions in accordance with the present invention is not particularly limited. One preferred process, for example, is a process comprising melt-kneading the above-mentioned components according to U.S. Pat. No. 5,756,659 and U.S. Pat. No. 6,455,636.

An extrusion apparatus that may be used in embodiments of the invention may be described as follows. An extruder, in certain embodiments a twin screw extruder, is coupled to a back pressure regulator, melt pump, or a gear pump. Embodiments also provide a base reservoir and an initial water reservoir, each of which includes a pump. Desired amounts of base and initial water are provided from the base reservoir and the initial water reservoir, respectively. Any suitable pump may be used, but in some embodiments a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

Polymer resin(s), in the form of pellets, powder, or flakes, for example, is fed from the feeder to an inlet of the extruder where the resin is melted or compounded. In some embodiments, the stabilizing agent is added to the resin through and along with the resin and in other embodiments, the stabilizing agent is provided separately to the twin screw extruder. The resin melt is then delivered from the mix and convey zone to an emulsification zone of the extruder where the initial amount of water and base from the reservoirs is added through the inlet. In some embodiments, stabilizing agent may be added additionally or exclusively to the water stream. In some embodiments, the emulsified mixture is further diluted with additional water inlet from the reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated.

In particular embodiments, it may be desired to utilize the dispersion in the form of foam. When preparing foams, it is often preferred to froth the dispersion. For example, the a froth and foam may be prepared as described in WO2005021622, which is fully incorporated herein by reference. Preferred in the practice of this invention is the use of a gas as a frothing agent. Examples of suitable frothing agents include: gases and/or mixtures of gases such as, air, carbon dioxide, nitrogen, argon, helium, and the like. Particularly preferable is the use of air as a frothing agent. Frothing agents are typically introduced by mechanical introduction of a gas into a liquid to form a froth. This technique is known as mechanical frothing. In preparing a frothed dispersion, it is preferred to mix all components and then blend the air or gas into the mixture, using equipment such as an OAKES, MONDO, or FIRESTONE frother.

Surfactants useful for preparing a stable froth are referred to herein as foam stabilizers. Foam stabilizers are useful in the practice of the present invention. Those having ordinary skill in this field will recognize that a number of foam stabilizers may be used. Foam stabilizers may include, for example, sulfates, succinamates, and sulfosuccinamates.

Polymer Coated Particles

As described above, the sands or other particulate materials may be coated or incorporated with a polymer or polymeric mixture, where the polymer may be supplied as a dispersion. The dispersion may include a base polymer, a stabilizing agent, and a dispersion medium, such as water, an organic solvent, or combinations thereof. The water or organic solvent used to form the dispersion may then be removed from the particulate substrate-dispersion mixture, returning a polymer coated particulate substrate. Although described herein with reference to aqueous dispersions, the processes and results apply equally to non-aqueous dispersions.

The polymer dispersion and the particulate materials may be incorporated, in one embodiment, by first pre-heating the particulate material to be coated to an elevated temperature. The particulate material may then be fed to a mixer, which may continuously agitate and disperse the contents of the mixer.

A polymer dispersion, as described above, may then be added to the mixer. In other embodiments, a frothed dispersion may be added to the mixer. The amount of dispersion added to the mixer may be based upon the amount of particulate material to be coated and the polymer content of the dispersion, and should be sufficient to form the desired level of coating on the particles.

The agitation should be sufficient to evenly distribute the dispersion throughout, evenly coating the particles with the dispersion. In some embodiments, the dispersion may coat at least 50 percent of the surface of the particulate substrate. In other embodiments, the dispersion may coat at least 60 percent of the surface of the particulate substrate; at least 70 percent in other embodiments; at least 80 percent in other embodiments; and at least 90 percent in yet other embodiments. In some embodiments, the extent of the coating may be observed by visual examination under a microscope, by changes in the overall color of the particulate substrate, or by measuring weight gain/loss and/or particle packing density. For example, where the polymer coating is of one color and the particulate substrate another, a visual inspection of the particles may provide a means to estimate the coating percentage.

The temperature of the pre-heated particles may be sufficient to evaporate at least a portion of the water in the aqueous dispersion. The particulate material may be pre-heated to a temperature between about 110° C. and 350° C., in some embodiments, where the temperature may be based upon the amount of water to be evaporated. Water vapor produced during the addition of the dispersion to the particles may be removed from the mixer. In other embodiments, the sand or other particulate materials may be pre-heated to a temperature between about 60° C. and 300° C.; between 140° C. and 250° C. in other embodiments; and between about 160° C. and 230° C. in yet other embodiments. In other embodiments, a mixture of the particulate substrate and the dispersion may be heated to the above described temperatures to volatilize the solvent and/or water.

The coated particles may then be cooled to a temperature of less than 100° C., after which the coated particles may be collected for use as infill or in other suitable applications. Although use of a dispersion to coat the particles may result in a free-flowing material, any agglomerates that may have formed may be segregated from the free-flowing material by sieving the particles, and the agglomerates may be discarded or may be de-agglomerated for use as infill.

In some embodiments, the coated particles may have a dry polymer content ranging from 0.1 weight percent to 20 weight percent. In other embodiments, the coated particles may have a dry polymer content ranging from 1 weight percent to 15 weight percent; from 2 weight percent to 13 weight percent in other embodiments; from 3 weight percent to 10 weight percent in other embodiments; from 4 weight percent to 8 weight percent in other embodiments; and from 5 weight percent to 7 weight percent in yet other embodiments.

In certain embodiments, the thermoplastic polymer may be crosslinked. In one embodiment, the thermoplastic polymer is at least partially crosslinked prior to coating the particulate substrate with the dispersion. In other embodiments, the thermoplastic polymer is at least partially crosslinked after the particulate substrate is coated with the dispersion. Any of the above described additives and methods may be used to crosslink the thermoplastic polymer. For example, the polymers may be crosslinked by any known means, such as the use of peroxide, electron beam, silane, azide, gamma irradiation, or other cross-linking techniques.

In some embodiments, the above described coated particles may be used as infill in a synthetic turf. Deformation of a synthetic turf system after long-time use may depend on the pile height, tufting density, and yarn strength. The type and volume of infill material also influence the final deformation resistance of the turf significantly. The Lisport test may be used to analyze wear performance, and is helpful to design an effective turf system. Additionally, tests may be performed to analyze temperature performance and aging, as well as the bounce and spin properties of the resulting turf. With regard to each of these properties, turf containing the infill materials as described above may meet FIFA specifications for use of the turf in football fields (see, for example, the "March 2006 FIFA Quality Concept Requirements for Artificial Turf Surfaces," the FIFA handbook of test methods and requirements for artificial football turf, which is fully incorporated herein by reference).

Embodiments of the polymer coated substrates described herein may have a color change according to test method EN ISO 20105-A02 of greater than or equal to grey scale 3. Other embodiments of the polymer coated substrates may meet the FIFA requirements for particle size, particle shape, and bulk density, as tested using test methods EN 933—Part 1, prEN 14955, and EN 13041, respectively. The polymer coated substrates may also comply with the DIN V 18035-7-2002-06 requirements for environmental compatibility.

EXAMPLES

Aqueous Dispersions

Dispersion 1: An aqueous dispersion of a propylene-ethylene copolymer was formed in accordance with the procedures as described in WO2005021638. Dispersion 1 was formed using a propylene-ethylene copolymer (approximately 9 weight percent ethylene, MI2 of 25 dg/min, and a density of 0.876 g/cc). The surfactant system used was PRIMACOR™ 5980I (an ethylene acrylic acid copolymer available from The Dow Chemical Company). PRIMACOR™ was used at a loading of 17 weight percent based on the weight of the propylene-ethylene copolymer.

The propylene-ethylene copolymer was dry blended with the surfactant. The mixture was then extruded at 4.5 kg/h (10 lbs/h) using a Berstorff ZE25 (36 L/D, 450 rpm) and a Schenck Mechatron loss-in-weight feeder. An ISCO dual-syringe pump metered a 45% (w/w) potassium hydroxide solution at 0.9 cc/min and DI water at 1.2 cc/min. The potassium hydroxide solution and DI water were mixed and pre-heated through a 24 inch core/shell heat exchanger (20 foot ⅛ inch tubing core) tempered by a DC200 silicone oil bath set at 150° C. and fed to the initial aqueous (IA) injector. Dilution water was delivered to the dilution water injector at a rate of 100 cc/min using an ISCO dual syringe pump. The dilution water was also passed through a similar pre-heater set at 150° C. Back pressure on the barrel was provided via a GO (Circor) BP-60 back-pressure regulator adjusted to maintain about 17.2 barg (250 psig) upstream pressure.

The dispersion product was collected directly after the back-pressure regulator, allowed to cool, filtered, and analyzed for particle size, pH, solids content, and viscosity. The aqueous dispersion produced had a solids content of 51.6 weight percent, a pH of 10.0, and a viscosity (RV-2 spindle, 22.5 C, 100 rpm) of 308 centipoise. The dispersed polymer phase measured by a Coulter LS230 particle analyzer consisted of an average volume diameter particle size of 0.99 microns and a particle size dispersity of 1.95.

Dispersion 2: Dispersion 2 was also formed in accordance with the procedures as described in WO2005021638 using an ethylene-octene copolymer (ENGAGE™ 8200, available from The Dow Chemical Company, having a MI2 of 5.0 dg/min and a density of 0.870 g/cc). The surfactant system used was PRIMACOR™ 5980I (as described above). PRIMACOR™ was used at a loading of 15 weight percent based on the weight of the ethylene-octene interpolymer.

The ethylene-octene copolymer was dry blended with the surfactant. The mixture was then extruded at 4.5 kg/h (10 lbs/h) using a Berstorff ZE25 (36 L/D, 450 rpm) and a Schenck Mechatron loss-in-weight feeder. An ISCO dual-syringe pump metered a 45% (w/w) potassium hydroxide solution at 0.9 cc/min and DI water at 1.2 cc/min. The potassium hydroxide solution and DI water were mixed and pre-heated through a 24 inch core/shell heat exchanger (20 foot ⅛ inch tubing core) tempered by a DC200 silicone oil bath set at 150° C. and fed to the initial aqueous (IA) injector. Dilution water was delivered to the dilution water injector at a rate of 100 cc/min using an ISCO dual syringe pump. The dilution water was also passed through a similar pre-heater set at 150° C. Back pressure on the barrel was provided via a GO (Circor) BP-60 back-pressure regulator adjusted to maintain about 17.2 barg (250 psig) upstream pressure.

The dispersion product was collected directly after the back-pressure regulator, allowed to cool, filtered, and analyzed for particle size, pH, solids content, and viscosity. The aqueous dispersion produced had a solids content of 45.8 weight percent, a pH of 10.1, and a viscosity (RV-2 spindle, 22.5 C, 100 rpm) of 104 centipoise. The dispersed polymer phase measured by a Coulter LS230 particle analyzer consisted of an average volume diameter particle size of 0.87 microns and a particle size dispersity of 1.62.

Polymer Coated Sand

The above described dispersions were used to form polymer coated sands. A silica based sand was heated to a temperature of 220° C. in a pre-heating unit. The pre-heated sand and an aqueous dispersion were then incorporated in a tumble mixer. Water vapor generated as a result of contacting the dispersion with the pre-heated sand was removed from the tumbler during mixing. The mixture formed was then cooled to a temperature of approximately 60° C. by directing air at ambient temperature through the mixer. The cooled mixture was then passed over a shaking sieve having 2 mm openings to separate free flowing particles from any agglomerates that may have formed during the process.

Dispersion 1 and Dispersion 2 were each used to form polymer coated sands. Polymer coated sands having a polyolefin content of 8 weight percent were produced. Analyses of the polymer coated sands formed from Dispersions 1 and 2 showed that the coated particles were free flowing.

The polymer coated sands produced as described herein may be useful as infill material for artificial soccer and sport surfaces, among other applications. Advantageously, embodiments disclosed herein may provide a polymer coated sand having a homogeneous and uniform coating, good heat and skid resistance, as well as good haptics and aesthetics. In particular, embodiments described herein may provide for a superior balance of these properties as compared to prior art infill, including one or more of improved color retention, better resiliency and wear resistance, better heat resistance, better turf stability at lower fill levels, improved flexibility and softness, and lower cost.

Embodiments of the polymer coated substrates described herein may also be useful in applications including rotomolded soft articles, proppants, infill for other artificial grass applications, such as golf courses and landscaping, and use in heavy layers for noise and vibration dampening, among others.

Other embodiments disclosed herein provide for a higher coating weight and wider choice of polymeric material in terms of composition and molecular weight, allowing for softer materials to be used, resulting in improved dampening characteristics. For example, the melt flow of the polyolefins described herein is not limited. The softer materials produced may result in a longer abrasion resistance due to decreased surface roughness.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All priority documents are herein fully incorporated by reference for all jurisdictions in which such incorporation is permitted. Further, all documents cited herein, including testing procedures, are herein fully incorporated by reference for all jurisdictions in which such incorporation is permitted to the extent such disclosure is consistent with the description of the present invention.

What is claimed:

1. A method of forming a polymer-coated particulate material, the method comprising:
    preparing a dispersion, the dispersion comprising:
        a thermoplastic polymer;
        a stabilizing compound; and
        a dispersion medium selected from the group consisting of an organic solvent, water, and combinations thereof;
    preheating a particulate substrate material to from 60° C. to 350° C.,
    mixing the preheated particulate material and the dispersion with agitation,
    allowing at least a portion of the dispersion medium to evaporate,
    removing at least a portion of the evaporated dispersion medium,
    and cooling the polymer-coated particulate material.

2. The method of claim 1, further comprising preheating the particulate substrate to a temperature greater than 100° C.

3. The method of claim 1, further comprising heating the mixture of the particulate substrate material and the dispersion to a temperature greater than 100° C.

4. The method of claim 1, wherein the thermoplastic polymer is selected from the group consisting of: propylene-based homopolymers, copolymers, interpolymers, and multi-block interpolymers; ethylene-based homopolymers, copolymers, interpolymers, and multi-block interpolymers; and combinations thereof.

5. The method of claim 1, wherein the thermoplastic polymer is selected from the group consisting of propylene-based multi-block interpolymers, ethylene-based multi-block interpolymers and combinations thereof.

6. The method of claim 1, wherein the particulate substrate is selected from the group consisting of mineral grains, sands, and rubber particles.

7. The method of claim 1, wherein the particulate substrate is a silica-based sand.

8. The method of claim 1, further comprising frothing the aqueous dispersion.

9. The method of claim 1, further comprising combining an adhesion promoter with the particulate substrate.

10. The method of claim 1, further comprising cross-linking at least a portion of the thermoplastic polymer.

11. The method of claim 1, wherein the applied compound further comprises one or more ultraviolet inhibitors.

12. The method of claim 1, wherein the applied compound further comprises an algae inhibitor, an antimicrobiological agent, a biocide, a fungicide, or combinations thereof.

* * * * *